United States Patent [19]

Max

[11] Patent Number: 5,125,079
[45] Date of Patent: Jun. 23, 1992

[54] METHOD FOR CONTROLLING THE DATA TRANSMISSION OF A CENTRAL UNIT INTERFACING CONTROL CIRCUIT AND CIRCUIT ARRANGEMENT FOR THE IMPLEMENTATION OF THE METHOD

[75] Inventor: Ruediger Max, Zorneding, Fed. Rep. of Germany

[73] Assignee: Siemens Aktiengesellschaft, Berlin and Munich, Fed. Rep. of Germany

[21] Appl. No.: 409,941

[22] Filed: Sep. 20, 1989

[30] Foreign Application Priority Data

Sep. 30, 1988 [EP] European Pat. Off. ........ 88116237.4

[51] Int. Cl.⁵ .............................................. G06F 13/14
[52] U.S. Cl. ................................ 395/325; 364/927.92; 364/927.98; 364/927.99; 364/926.9; 364/949.3; 364/239; 364/239.1; 364/239.7
[58] Field of Search ... 364/200 MS File, 900 MS File

[56] References Cited

U.S. PATENT DOCUMENTS 4,433,378 2/1984 Leger .................................. 364/200
4,945,473 7/1990 Holtey et al. ...................... 364/200

FOREIGN PATENT DOCUMENTS 0045438 7/1981 European Pat. Off. .
0260693 9/1987 European Pat. Off. .
2070355 9/1971 France .
WO86/05293 9/1986 PCT Int'l Appl. .

OTHER PUBLICATIONS

"Designing a Microprocessor Driven Multipurpose Peripheral Controller", by R. F. Binder, Computer Design, Apr. 1979, pp. 83-91.

"Advanced Electronic Circuits" by U. Tietze et al., 4th edition 1978, Springer-Verlag Berlin Heidelberg, New York, 1978, pp. 292, 322 (corresponding German reference also submitted).

Primary Examiner—Michael R. Fleming
Assistant Examiner—Debra A. Chun
Attorney, Agent, or Firm—Hill, Van Santen, Steadman & Simpson

[57] ABSTRACT

A method for controlling the data transmission of a central unit interfacing control circuit and a circuit arrangement for the implementation of the method. The control of the data transmission between a central unit and a communication controller with the central unit interfacing control circuit is guaranteed under real-time conditions on a part of the central unit channel interface and is guaranteed on a part of the communication controller with a processing speed inherent in the microprocessor unit that controls the central unit interfacing control circuit. The central unit interfacing control circuit has a ROM interface controller that controls all control executions at the central unit channel interface under real-time conditions thereby relieving the microprocessor unit. The microprocessor unit can thereby operate the communication controller interface with its maximum possible processing speed.

5 Claims, 2 Drawing Sheets

FIG 3

| EXECUTIVE STEPS | FUNCTION | EXECUTION |
|---|---|---|
| 1 | OUTPUT INSTRUCTION | ZE |
| 2 | INITIALIZAT.(ACCEPTING THE INSTRUCTION AT THE ZE-SST) | ROM-STW |
| 3 | STORING THE INSTRUCTION IN THE FIFO | ROM STW |
| 4 | POTENTIAL REPITITION OF STEPS 1-3 FOR OTHER ZE DEVICE ADDRESSES OF THE ZAS | |
| 5 | READING INSTRUCTIONS FROM THE FIFO | MP |
| 6 | ANALYZING INSTRUCTIONS | MP |
| 7 | EXECUTE INSTRUCTIONS (e.g., READ OR WRITE) | MP/ROM-STW |
| 8 | PREPARE DATA TRANSFER | MP |
| 9 | START DATA TRANSFER | ROM-STW |
| 10 | PREPARE END OF DATA TRANSFER (MESSAGE) | MP |
| 11 | START END OF DATA TRANSFER (MESSAGE) | ROM-STW |

_5,125,079_

METHOD FOR CONTROLLING THE DATA TRANSMISSION OF A CENTRAL UNIT INTERFACING CONTROL CIRCUIT AND CIRCUIT ARRANGEMENT FOR THE IMPLEMENTATION OF THE METHOD

BACKGROUND OF THE INVENTION

The present invention is directed to a method for controlling the data transmission between a central unit and a communication controller with an intervening microprocessor controlled central unit interfacing control circuit having respective interface circuits for the communication controller and the central unit, and is directed to a circuit arrangement for the implementation of the method.

In the data transmission between a central unit and a communication controller or data transmission processor, a microprocessor-controlled central unit that interfaces the control circuits are utilized in order to optimally quickly accept and execute central unit instructions (for example, read, write) that are output via a channel interface of the central unit to the central unit interfacing control circuit. The firmware of the microprocessor unit controlling the central unit interfacing control circuit not only controls the central unit channel interface but also controls the interface to the communication controller. Since the central unit has highest priority, the firmware of the microprocessor unit of the central unit interfacing control circuit must, if at all possible, react immediately to the central unit requests. The firmware of the microprocessor unit frequently experiences interruptions that are completely asynchronous relative to the ongoing instruction executions in order to control the operational sequences at the central unit channel interface. A problem is that there are firmware sequences that are not allowed to be interrupted. When the central unit operates with a plurality of device addresses quasi-simultaneously, time-consuming address switching events must additionally be continuously controlled by the firmware of the microprocessor unit. When it is necessary that the central unit be operated under real time conditions, the firmware gets into more and more difficulty handling both interfaces with adequate speed. The channel interface of the central unit is occupied longer than necessary and as a result is not usable for additionally connected periphery equipment.

PCT Application WO 86/05293 discloses a microprocessor-controlled central unit interfacing control circuit that provides data transmission from a central unit to a plurality of different periphery equipment. It has an input circuit portion connected to the central channel interface and has two output circuit portions where one controls the data exchange with a printer means and the other controls the data exchange with at least one tape recorder means. The input circuit portion is allocated to one of the output circuit portions. If both output circuit portions wish to simultaneously access the input circuit portions, a referee means decides which output circuit the input circuit is allocated to. In this case, the data transmission can only be implemented with a delay. A data transmission in burst mode is thereby possible. The goal of the known central unit interfacing control circuit is to execute a data transmission between a central unit and a plurality of periphery equipment with optimally few central unit interruptions.

In addition to central unit interfacing control circuits, sequential logical systems are also known in the prior art (see Tietze/Schenk, Halbleiterschaltungstechnik, 4th Edition, 1978, Springer-Verlag, page 457). Sequential logic systems are thereby composed of a combinatorial portion, a combinational logic system. and of a status memory in which the system status is stored for a time clock. The new system status depends on the old system and on the input variables.

The output variables of the sequential logic system depend on the input variables thereof and on the old system status. The sequence of the system statuses can be defined by the selection of the input variables and of the old system status.

SUMMARY OF THE INVENTION

It is an object of the present invention to specify a method and a circuit arrangement for controlling the data transmission between a central unit and a communication controller with an intervening microprocessor-controlled central unit interfacing control circuit wherein the operation of a central unit channel interface is possible under real-time conditions and the operation of a communication controller channel interface is possible with the processing speed inherent in the microprocessor unit that controls the central unit interfacing control circuit.

For the method, this object is achieved by a method for controlling data transmission between the central unit and the communication controller with the intervening microprocessor-controlled central unit interfacing control circuit having respective interface circuits for the communication controller and for the central unit. The method has the steps of: forming all accesses to the interface circuit for the central unit by a ROM interface controller; decoding and subsequently intermediately storing instructions sent by the central unit by the ROM interface controller; reading out as a packet, analyzing and successively handling in order according to priorities the intermediately stored instructions; after reading out and handling the intermediately stored instructions, reading out again in packet fashion the next intermediately stored instructions; if no further instructions are present, monitoring the arrival of new instructions by ongoing interrogation; and intermediately storing control instructions to the ROM interface controller on a part of the microprocessor unit that controls the central unit interfacing control circuit. The data transmission between the central unit and the ROM interface controller can be carried out in a multi-byte burst mode.

The ROM interface controller relieves the microprocessor unit that controls the central unit interfacing control circuit in that it controls the central unit channel interface instead of the microprocessor unit. The synchronous events at the central unit channel interface are decoupled by the ROM interface controller from the firmware executions of the central unit interfacing control circuit. The ROM interface controller, and, as a consequence of being relieved by the ROM interface controller, the microprocessor unit is so fast that the central unit channel interface or the central unit can be operated under real-time conditions. This is also possible when the central unit works quasi-simultaneously with a plurality of device addresses. An increase in the data throughput in the data transmission is achieved when the data transmission is carried out in multi-byte burst mode.

The circuit arrangement for the implementation of the method has a ROM interface controller having a FIFO instruction memory unit and a control register unit connected between a microprocessor unit that controls the central unit interfacing control circuit and a central unit interface circuit for interfacing with the central unit. The central unit interfacing control circuit is connected to the ROM interface controller via central unit command lines. The ROM interface controller is connected to the central unit interface circuit via controller control lines and is connected to the FIFO instruction memory unit via command lines. The FIFO instruction memory unit is connected to the microprocessor unit via memory command lines. The microprocessor unit is connected to the control register unit via processor message lines and the control register unit is connected via first and second processor answer back lines to the ROM interface controller and to the central unit interface circuit, respectively.

The FIFO instruction memory unit used simplifies the memory administration for the instruction information that is sent from the central unit and is intermediately stored in the FIFO instruction memory unit.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 3 is a chart of a table of successive work steps with respective allocation of the circuit components of the central unit interfacing control circuit of FIG. 1.

DESCRIPTION OF THE PREFERRED EMBODIMENT

Figure 1:
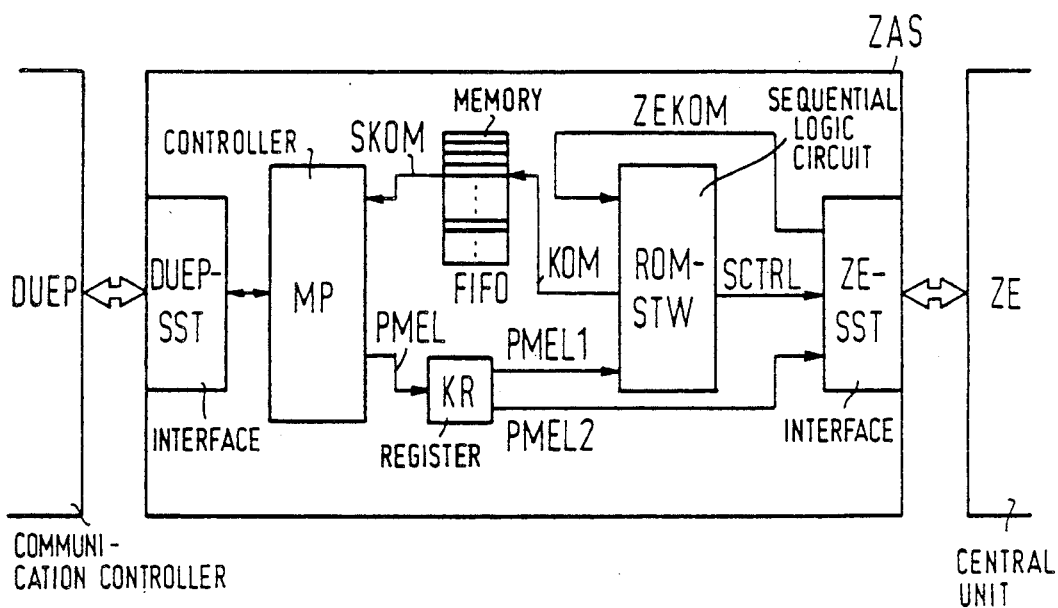
FIG. 1 is a block diagram illustration of a central unit interfacing control circuit of the present invention arranged between a central unit and a communication controller.

FIG. 1 shows a central unit interfacing control circuit ZAS that is arranged between a communication controller DUEP and a central unit ZE. The central unit interfacing control circuit ZAS has a known communication controller interface circuit DUEP-SST in the direction of the communication controller and a known central unit interface circuit ZE-SST in the direction of the central unit ZE. The two interface circuits DUEP-SST and ZE-SST control the signals on the transmission lines to the connected, neighboring units as shown. Inside the central unit interfacing control circuit ZAS, the central unit interface circuit ZE-SST is controlled with a ROM interface controller ROM-STW and the communication controller interface circuit DUEP-SST is controlled with the microprocessor unit MP that controls the central unit interfacing control circuit ZAS overall. A FIFO instruction memory unit FIFO and a control register unit KR are arranged between the ROM interface controller ROM-STW and the microprocessor unit MP. The FIFO instruction memory unit FIFO is described by the ROM interface controller ROM-STW and is repeatedly read out by the microprocessor unit MP. The control register unit KR serves the microprocessor unit MP for transferring answer backs to the ROM interface controller ROM-STW and the central unit interface circuit ZE-SST. The microprocessor unit MP is thus decoupled from the central unit interface circuit ZE-SST. It does not access this interface circuit. All of the control events relating to the central unit interface circuit ZE-SST are executed by the ROM interface controller ROM-STW.

Via messages (for example, read instruction executed without errors), the microprocessor unit MP informs the ROM interface controller ROM-STW what activities related to the central unit are required. The processor messages formulated for this purpose are forwarded via the processor message lines PMEL to the control register unit KR that forwards a request for transfer of a central unit message to the ROM interface controller ROM-STW via the processor answer back lines PMEL1. The central unit messages themselves are forwarded to the central unit channel interface ZE-SST via the processor answer back lines PMEL2. The message contents are transparent for the ROM interface controller ROM-STW, i.e. the messages on the processor answer back lines PMEL2 are not interpreted by the ROM interface controller ROM-STW. The ROM interface controller ROM-STW, however, converts these messages into signal sequences and messages to the central unit channel interface ZE-SST. Quasi-simultaneously with these executions, the ROM interface controller ROM-STW, however, can accept instructions for other central unit device addresses of the central unit interfacing control circuit ZAS without interrupting the microprocessor unit MP. The messages, for example, can involve the acknowledgment of a preceding activity or can involve the request to begin with a prescribed control sequence in the direction of the central unit ZE.

In a reverse direction, all instructions sent from the central unit ZE are first forwarded to the ROM interface controller ROM-STW via the central unit command lines ZEKOM. The ROM interface controller ROM-STW decodes the instructions and passes them on via the command lines KOM to the FIFO instruction memory unit FIFO where they are intermediately stored. The microprocessor unit MP monitors the arrival of the instructions with continuous interrogation of the FIFO instruction memory unit FIFO in case instructions are not yet intermediately stored therein. When instructions arrive or when instructions are already intermediately stored, they are read out by the microprocessor unit MP via the memory command lines SKOM, are analyzed and then executed in the sequence of their priorities. After the execution of an instruction, the microprocessor unit MP looks again to see whether new instructions were intermediately stored in the meantime. It then proceeds in the fashion set forth above.

Figure 2:
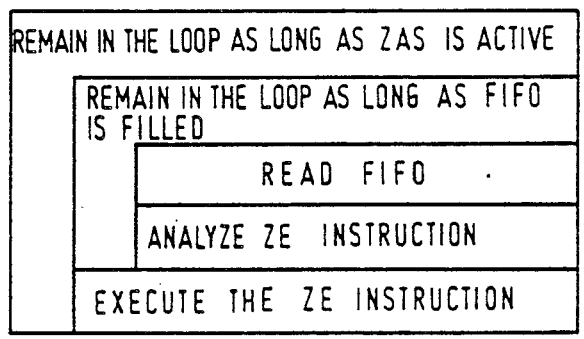
FIG. 2 is a flow chart diagram showing the fundamental work execution of the microprocessor unit of the central unit interfacing control circuit of FIG. 1.

The fundamental work execution of the microprocessor unit MP is shown in FIG. 2 as a flow chart. The work execution is essentially composed of an inner loop and an outer loop. The microprocessor unit MP remains in the outer loop as long as the central unit interfacing control circuit ZAS is active. The inner loop reproduces the above-described work execution of the microprocessor unit MP. Even though not explicitly recited, it is nonetheless clear that branch-outs from the work execution are possible in order, for example, to be able to react to high-ranking events. For example, the central unit reset command or the interface disconnect command must be capable of being immediately handled.

The central unit ZE can work quasi-simultaneously with a plurality of device addresses, for example, eight device addresses. On the basis of a corresponding software control in the central unit ZE, a maximum of two instructions can simultaneously pend at the FIFO instruction memory unit FIFO per device address, whereby the pending instruction should be prematurely ended by the following instruction. The FIFO instruction memory unit FIFO therefore requires only two times eight memory locations for the possibly sixteen instructions pending simultaneously without a risk of overflow existing. When an attempt is made to deliver more than two instructions per device address, the ROM interface controller ROM-STW logs on via the controller control line SCTRL and intercepts further instruction outputs on the part of the central unit ZE in that it switches the ROM interface controller ROM-STW into the busy condition.

FIG. 3 shows a table wherein the interaction between the central unit ZE, the ROM intercept controller ROM-STW and the microprocessor unit MP is recited in terms of the critical steps upon output of a read or write instruction by the central unit ZE. The fact that the central unit ZE would like to output an instruction is recognized by the ROM interface controller ROM-STW on the basis of a signal sequence that sequences at the central unit channel interface ZE-SST that the ROM interface controller ROM-STW monitors. After the recognition of such a sequence, the ROM interface controller ROM-STW starts a signal sequence that is referred to in FIG. 3 as "initializing". The ROM interface controller ROM-STW acknowledges the wish that the central unit ZE would like to output an instruction, informs the latter of its own momentary condition and outputs the request to forward the instruction. After the central unit ZE has forwarded the instruction to the ROM interface controller ROM-STW, the decoding thereof ensues. It is subsequently written into the FIFO instruction memory unit FIFO.

A repetition of the above-described steps potentially ensues for other central unit device addresses of the central unit interfacing control circuit ZAS.

The microprocessor unit MP is not aware of the control executions at the central unit channel interface ZE-SST. Within the framework of the ongoing, periodic interrogations of the FIFO instruction memory unit FIFO, the microprocessor unit MP determines that an instruction is intermediately stored, whereupon it reads the instruction out. If a plurality of instructions had been output during the most recent instruction execution phase, more than this one instruction can reside in the FIFO instruction memory unit FIFO. In this case, the microprocessor unit MP reads all intermediately stored instructions out in one packet.

After the microprocessor unit MP reads out the instruction or instructions, it analyzes the instruction or instructions and prepares the instruction execution in that, for example, it identifies the receiver and the transmitter of the data transmission and loads the address indicator for the DMA data transmission. The microprocessor unit MP and the ROM interface controller ROM-STW alternate in the instruction execution.

The data transmission is started proceeding from the ROM interface controller ROM-STW. During the data transmission, the central unit interface circuit ZE-SST is controlled by the ROM interface controller ROM-STW. For example, the signals "service-in" and "service-out" are set by the ROM interface controller ROM-STW.

The end of a central unit instruction is again prepared by the microprocessor unit MP, whereas the starting of the end (message transfer) again occurs with the ROM interface controller ROM-STW.

A plurality of data bytes or an entire data block are transmitted by the central unit interfacing control circuit ZAS in the burst mode. The central unit channel interface ZE-SST is occupied during this time.

In the 16 byte burst mode, a maximum of 16 data bytes are transmitted in the burst mode by the central unit interfacing control circuit ZAS and the data transmission is subsequently interrupted in order to free the channel for other control operations.

Compared to byte multiplexing mode, the 16 byte burst mode allows the transmission of data with a higher data rate. In the byte multiplexing mode, the time between two REQUESTS in the central unit interfacing control circuit ZAS is so short for the transmission of data bytes that the central unit channel interface ZE-SST is not freed for any other control operation during the data transmission. The central unit channel interface ZE-SST, however, requires a longer pause in order to start a new instruction to the central unit channel interface ZE-SST. Given a lower data rate, it is thus occupied in exactly the same way in the byte multiplexing mode as in the burst mode. A higher data throughput is therefore achieved with the data transmission in multi-byte burst mode in comparison to a traditional byte multiplexing transmission given simultaneous operation of the central unit ZE under real-time conditions.

The ROM interface controller ROM-STW is realized such that it has seven decision variables, sixteen control variables and two hundred internal statuses. The decision variables are formed by the signals transmitted via the central unit command lines ZEKOM and the processor answer back lines PMEL1, whereas the control variables are formed by the signals transmitted via the command lines KOM and via the controller control lines SCTRL. As a result of the complexity of the ROM interface controller ROM-STW, the development is realized with the assistance of a CAD method.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for controlling data transmission between a central unit and a communication controller with an intervening microprocessor-controlled central unit interfacing control circuit having respective interface circuits for the communication controller and for the central unit, comprising the steps of: executing all accesses to the central unit interface circuit for interfacing with the central unit by a ROM interface controller; decoding and subsequently intermediately storing in a FIFO instruction memory unit instructions sent by the central unit by the ROM interface controller; reading out as a packet, analyzing and successively handling in order according to priorities by a microprocessor the instructions intermediately stored in the FIFO instruction memory unit by the ROM interface controller; after reading out and handling the instructions intermediately stored in the FIFO instruction memory unit by the ROM interface controller, reading out again in packet fashion by the microprocessor any further instructions intermediately stored in the FIFO instruction memory unit by the ROM interface controller; if no further instructions are present in the FIFO instruction memory unit, monitoring the arrival of new instructions in the FIFO instruction memory unit, by continuous interrogation of the FIFO instruction memory unit by the microprocessor unit; and intermediately storing control instructions in a control register connected between the ROM interface controller and the microprocessor unit that controls the central unit interfacing control circuit, the control instructions being sent by the microprocessor unit.

2. The method according to claim 1, wherein the data transmission between the central unit (ZE) and the ROM interface controller (ROM-STW) is carried out in a multi-byte burst mode.

3. A microprocessor-controlled central unit interfacing control circuit functioning as a connecting element between a communication controller and a central unit, and having respective interface circuits for the communication controller and for the central unit, comprising: a ROM interface controller and a microprocessor that controls the central unit interfacing control unit, a FIFO instruction memory unit and a control register unit connected between the ROM interface controller and the microprocessor unit that controls the central unit interfacing control circuit and a central unit interface circuit for interfacing with the central unit, the central unit interface circuit being connected to the ROM interface controller via central unit command lines, the ROM interface controller being connected to the central unit interface circuit via controller control lines and being connected to the FIFO instruction memory unit via command lines, the FIFO instruction memory unit being connected to the microprocessor unit via memory command lines, the microprocessor unit being connected to the control register unit via processor message lines and the control register unit being connected via first and second processor answer back lines to the ROM interface controller and to the central unit interface circuit, respectively.

4. The microprocessor-controlled central unit interfacing control circuit (ZAS) according to claim 3, further comprising a communication controller interface circuit (DUEP-SST) for interfacing with the communication controller and connected to the microprocessor unit (MP).

5. A method for controlling data transmission between a central unit and a communication controller with an intervening microprocessor-controlled central unit interfacing control circuit having respective interface circuits for the communication controller and for the central unit, comprising the steps of: executing by means of a ROM interface controller all accesses to the interface circuit for the central unit; decoding in the ROM interface controller instructions sent by the central unit to the ROM interface controller and subsequently intermediately storing in a FIFO instruction memory unit the instructions sent by the central unit; reading out as a packet, analyzing and successively handling in order according to priorities by means of a microprocessor the instructions intermediately stored in the FIFO instruction memory unit by the ROM interface controller; after reading out and handling the instructions intermediately stored in the FIFO instruction memory unit by the ROM interface controller, reading out again in packet fashion by means of the microporocessor any further instructions intermediately stored in the FIFO instruction memory unit by the ROM interface controller; if no further instructions are present in the FIFO instruction memory unit, monitoring the arrival of new instructions in the FIFO instruction memory unit, by continuous interrogation of the FIFO instruction memory unit by the microprocessor unit; and intermediately storing control instructions in a control register connected between the ROM interface controller and the microprocessor unit that controls the central unit interfacing control circuit, the control instructions being sent by the microprocessor unit; data transmission between the central unit and the ROM interface controller being carried out in a multi-byte burst mode.

* * * * *